(12) United States Patent
Corghi

(10) Patent No.: US 10,989,624 B2
(45) Date of Patent: Apr. 27, 2021

(54) VEHICLE HEADLIGHT MEASUREMENT SYSTEM INSTRUMENTATION STRUCTURE

(71) Applicant: NEXION S.P.A., Correggio (IT)

(72) Inventor: Giulio Corghi, Correggio (IT)

(73) Assignee: NEXION S.P.A., Correggio (IT)

(*) Notice: Subject to any disclaimer, the term of this patent is extended or adjusted under 35 U.S.C. 154(b) by 0 days.

(21) Appl. No.: 16/582,410

(22) Filed: Sep. 25, 2019

(65) Prior Publication Data

US 2020/0103308 A1    Apr. 2, 2020

(30) Foreign Application Priority Data

Sep. 28, 2018   (IT) .................. 102018000009025

(51) Int. Cl.
*G01M 11/06* (2006.01)

(52) U.S. Cl.
CPC ........ *G01M 11/064* (2013.01); *G01M 11/067* (2013.01)

(58) Field of Classification Search
CPC .......................... G01M 11/064; G01M 11/067
See application file for complete search history.

(56) References Cited

U.S. PATENT DOCUMENTS

| | | | | |
|---|---|---|---|---|
| 3,843,262 A * | 10/1974 | Lazarev | ............... | G01M 11/061 356/121 |
| 4,634,275 A * | 1/1987 | Yoshida | ............... | G01M 11/065 348/95 |
| 4,973,155 A * | 11/1990 | Masuda | ............... | G01M 11/064 356/121 |
| 5,164,785 A * | 11/1992 | Hopkins | ............... | G01M 11/064 356/121 |
| 5,321,439 A * | 6/1994 | Rogers | ................. | G01M 11/064 348/135 |
| 5,379,104 A * | 1/1995 | Takao | ................... | G01M 11/064 356/121 |
| 6,363,619 B1 | 4/2002 | Schirmer et al. | | |
| 8,274,648 B2 * | 9/2012 | Corghi | ............... | G01B 11/2755 356/139.09 |
| 8,538,724 B2 * | 9/2013 | Corghi | ............... | G01B 11/2755 702/150 |
| 9,863,843 B2 * | 1/2018 | Ekladyous | ........... | G01M 11/061 |
| 2007/0296961 A1 | 12/2007 | Sekine et al. | | |
| 2012/0224171 A1 | 9/2012 | Yotz et al. | | |
| 2019/0249985 A1 * | 8/2019 | Stieff | ................... | G01B 11/272 |
| 2020/0105018 A1 * | 4/2020 | Corghi | ................ | H04N 17/002 |

(Continued)

FOREIGN PATENT DOCUMENTS

WO    2018067354 A1    4/2018

*Primary Examiner* — Deoram Persaud
(74) *Attorney, Agent, or Firm* — Pearne & Gordon LLP

(57) ABSTRACT

A vehicle headlight measurement system instrumentation structure, comprises: a support structure; a vehicle calibration assistance structure, which is carried by the support structure and includes a headlight aiming device; a positioning target element, having a surface provided with a predetermined graphical feature, the positioning target element being supported by the support structure and oriented in a forward direction towards the service area; a positioning device, configured for aiding a relative positioning between the vehicle and the vehicle calibration assistance structure; a processing system which is operatively connected to the positioning device.

15 Claims, 5 Drawing Sheets

(56) References Cited

U.S. PATENT DOCUMENTS

| | | | |
|---|---|---|---|
| 2020/0158598 A1* | 5/2020 | Corghi | G01M 11/067 |
| 2020/0239009 A1* | 7/2020 | Corghi | B60W 40/04 |
| 2020/0239010 A1* | 7/2020 | Corghi | G01S 7/40 |

* cited by examiner

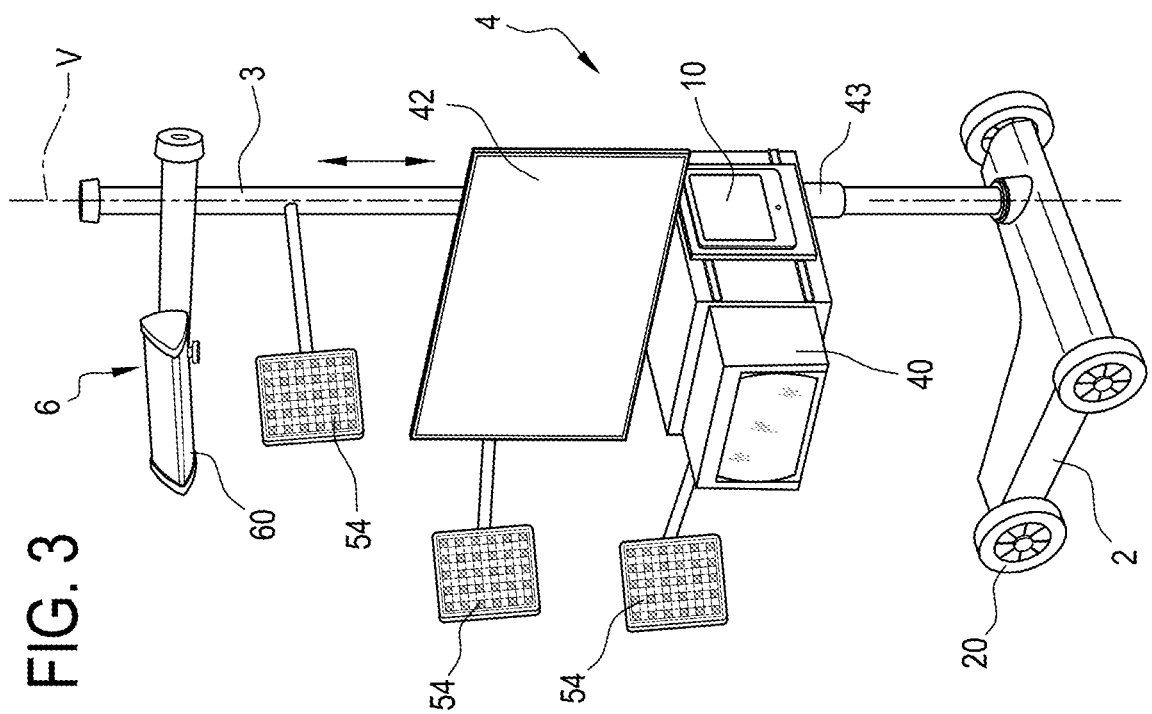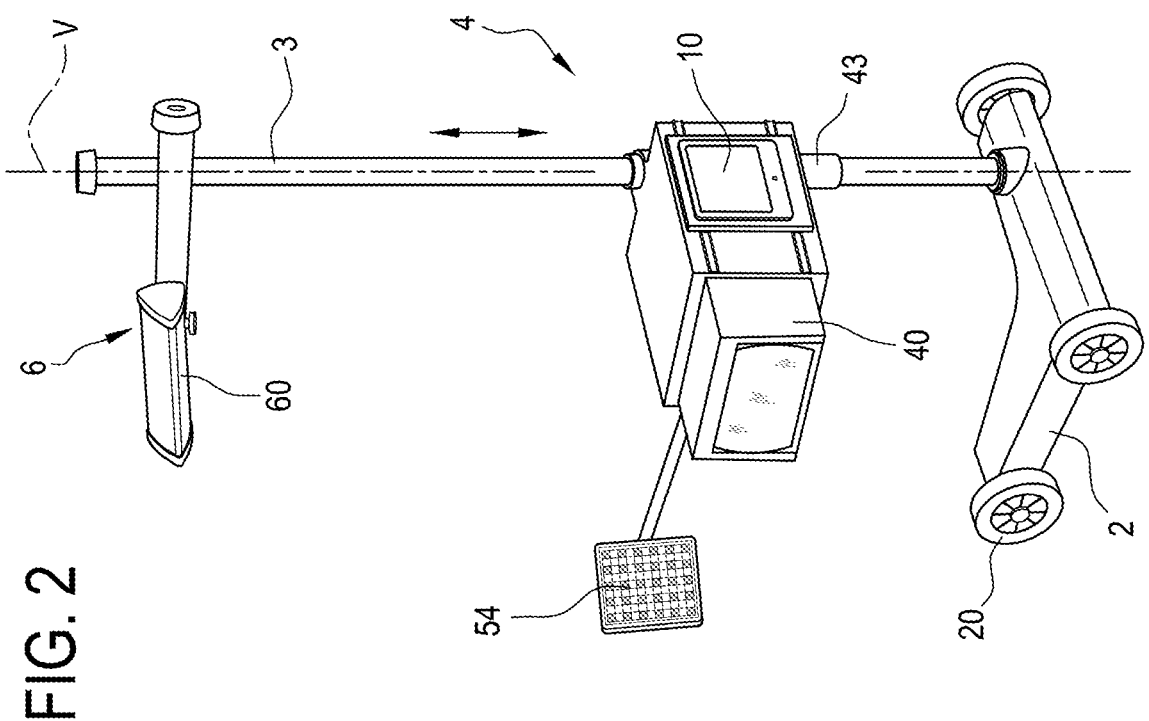

VEHICLE HEADLIGHT MEASUREMENT SYSTEM INSTRUMENTATION STRUCTURE

TECHNICAL FIELD OF THE INVENTION

This invention relates to a vehicle headlight measurement system instrumentation structure (hereinafter also referred to simply as vehicle headlight aiming device) and a method for aligning a headlight aiming device mounted on a vehicle headlight measurement system instrumentation structure.

BACKGROUND OF THE INVENTION

In this field, it is common practice to calibrate and align vehicle headlights using structures positioned in front of the vehicle. For example, patent document U.S. Pat. No. 6,363,619B1 describes a vehicle headlight aiming device associated with a system for calibrating a radar proximity sensor; the headlight aiming device is configured to be positioned in front of the vehicle with the aid of a positioning system which includes alignment mirrors. The positioning systems of prior art headlight aiming devices have several disadvantages: in effect, positioning is highly time-consuming and not very precise (resulting in imprecise headlight alignment).

This disclosure has for an aim to provide a vehicle headlight measurement system instrumentation structure (or vehicle headlight aiming device) and a method for aligning a headlight aiming device mounted on a headlight aiming device to overcome the above mentioned drawbacks of the prior art.

SUMMARY OF THE INVENTION

This aim is fully achieved by the vehicle headlight aiming device and the method for aligning the headlight aiming device of this disclosure, as characterized in the appended claims.

According to one aspect, this disclosure relates to a vehicle headlight measurement system instrumentation structure (that is a vehicle headlight aiming device).

In an embodiment, the headlight aiming device includes a base unit. In an embodiment, the headlight aiming device comprises a support structure. The support structure is connected to the base unit.

In an embodiment, the headlight aiming device comprises a vehicle calibration assistance structure. The vehicle calibration assistance structure is mounted on (that is, connected to) the support structure.

According to one aspect of it, this disclosure relates to a system for adjusting a vehicle sensor. In an embodiment, the support structure thus forms part of the system for adjusting a vehicle sensor. What is described hereinafter in connection with the headlight aiming device also applies, with the necessary changes made, to the case where the system is a system for adjusting a vehicle sensor (whether stand-alone or integrated in the testing instrument system).

In an embodiment, the vehicle calibration assistance structure includes a headlight aiming device. The headlight aiming device is configured to facilitate alignment or calibration of a vehicle headlight. The vehicle is positioned in a service area (during a headlight alignment or calibration procedure). The service area is arbitrary, it is assumed as the place where the vehicle is operatively positioned during the headlight alignment or calibration procedure; the service area may be defined, for example, on the floor of the tyre shop or on a listing structure. The service area, per se, is not included in the instrumentation structure.

The headlight aiming device is positioned forward of the vehicle (that is, in front of the vehicle in the vehicle's forward travel direction) which is positioned in the service area. Preferably, the support structure is adjacent to the service area.

In an embodiment, the headlight aiming device comprises a positioning target element. The positioning target element includes a surface provided with a predetermined graphical feature. The positioning target element is supported by the support structure. In an embodiment, the positioning target element is connected to the support structure. In an embodiment, the positioning target element is connected to the vehicle calibration assistance structure. In an embodiment, the positioning target element is connected to the headlight aiming device. The positioning target element is oriented in a forward (that is, frontal or anterior) direction towards the service area. In other words, the positioning target element is oriented in a forward direction, wherein the forward direction is operatively oriented towards the service area. Hence, the the positioning target element is operatively oriented in the forward direction towards the service area.

In an embodiment, the headlight aiming device comprises a positioning device. The positioning device is configured to aid relative positioning between the vehicle and the vehicle calibration assistance structure. In an embodiment, the positioning device is located in the service area. In an embodiment, the positioning device is located beside the vehicle.

In an embodiment, the positioning device is movable on wheels. In an embodiment, the positioning device is movable on guides. In an embodiment, the guides (preferably two) are elongate in a direction parallel to the vehicle. In an embodiment, the positioning device is movable between four operating positions, where it respectively "sees" each of the four vehicle wheels.

In an embodiment, the positioning device is spaced from the support structure. In other words, the positioning device is located at a distance from the support structure (this distance being greater than zero); this distance could be a predefined distance.

In an embodiment, the positioning device includes an optical device, oriented in a lateral direction to see graphical features of the vehicle. The lateral direction is substantially transversal to the forward direction.

Preferably, the lateral direction is defined by the positioning device towards the vehicle (preferably, towards an axle or a wheel of the vehicle). In an embodiment, the positioning device includes a matching camera oriented in a backward direction to see the positioning target element. The backward direction is substantially opposite the forward direction.

By "forward direction" is meant the direction from the support structure to the service area. By "backward direction" is meant, vice versa, the direction from the service area to the support structure (opposite to the "forward" direction).

In an embodiment, the system comprises a processing system. The processing system is operatively connected to the positioning device to receive data therefrom. In an embodiment, the data that the positioning device sends to the processing system are image data, captured by the matching camera and the optical device.

The processing system includes a processor. The processor is programmed with instructions for processing the data received from the positioning device. The processor is programmed to determine measurements. In an embodiment, the measurements include at least one spatial correlation between the vehicle calibration assistance structure and the vehicle. In an embodiment, the processor is configured to determine measurements that include a position of the support structure relative to a thrust axis of the vehicle. In an embodiment, the processor is configured to determine measurements that include a position of the support structure relative to a centre line of the vehicle.

In an embodiment, the measurements include at least one spatial correlation between the headlight aiming device and the vehicle. In an embodiment, the measurements include at least one spatial correlation between the support structure and the vehicle.

The use of a positioning device which includes an optical device and a matching camera and which is connected to the processing system to correctly position the vehicle calibration assistance structure (hence the headlight aiming device) relative to the vehicle, allows positioning to be carried out quickly and precisely.

In an embodiment, the optical device includes a first camera. In an embodiment, the optical device includes a second camera. The first camera and the second camera are connected in a stereo configuration. In an embodiment, the processing system is configured to derive a 3D representation of a vehicle portion viewed by the first and the second camera.

In an embodiment, the positioning device includes a frame. In an embodiment, the optical device and the matching camera are attached to the frame.

In an embodiment, the positioning device includes an electronic board configured to transmit data to the processing system. In an embodiment, the electronic board of the positioning device is attached to the frame. In an embodiment, the electronic board of the positioning device is remote.

In an embodiment, the electronic board of the positioning device is connected to the first and the second camera. In an embodiment, the electronic board is connected to the matching camera. The electronic board of the positioning device is configured to transmit data (in an embodiment, image data) to the processing system.

In an embodiment, the vehicle calibration assistance structure includes a carriage. The carriage is movably connected to the support structure. In an embodiment, the carriage is slidable along the support structure in a vertical direction (parallel to the weight force). In an embodiment, the carriage comprises a blocking member configured to block it at a certain height along the support structure. In an embodiment, the carriage can be positioned at a plurality of positions on the support structure. In an embodiment, the headlight aiming device is mounted on the carriage (in an embodiment, removably). In an embodiment, the positioning target element is attached to the carriage. That way, the processing system can determine a spatial correlation between the carriage (hence the headlight aiming device mounted on the carriage) and the vehicle as a function of the data received from the positioning device.

In an embodiment, the vehicle calibration assistance structure includes an optical projection system. In an embodiment, the optical projection system includes (at least) a laser emitter. In an embodiment, the laser emitter can pivot, that is, oscillate, about its axis.

In an embodiment, the processing system is operatively coupled to the optical projection system to activate the laser emitter to project a ray onto a surface in proximity to the vehicle headlight aiming device. In an embodiment, the processing system is connected to the optical projection system to determine a distance between the laser projector and the surface on which the laser ray is projected (which may be a surface of the vehicle). The optical projection system is useful, in particular, for prepositioning the calibration assistance structure at a predetermined, factory-set distance from the vehicle.

In an embodiment, the headlight aiming device includes an optic housing having one or more Fresnel lenses. The light from the headlight passes through one or more Fresnel lenses and is concentrated on a surface of the optic housing in order to test the headlights.

In an embodiment, the system includes an operator interface. In an embodiment, the operator interface includes an input device. In an embodiment, the operator interface includes an output device. In an embodiment, the input device is a keyboard. In an embodiment, the output device is a screen. In an embodiment, the screen is a touch screen and can therefore be used both as an input device and an output device.

In an embodiment, the vehicle calibration assistance structure comprises a safety calibration device. The safety calibration device is configured to facilitate alignment or calibration of a component (or two or more components) of a safety system of the vehicle. In an embodiment, the component of the safety system of the vehicle forms part of an advanced driver-assistance system (ADAS): for example, it may be a camera, a laser sensor or a radar sensor.

In an embodiment, the vehicle calibration assistance structure comprises the safety calibration device and not the headlight aiming device. In this case, the system of this disclosure is a system for adjusting a vehicle sensor.

In an embodiment, the vehicle calibration assistance structure comprises both the safety calibration device and the headlight aiming device.

In an embodiment, the safety calibration device includes a reflector. In an embodiment, the reflector is configured to reflect electromagnetic waves. The reflector is configured to facilitate alignment or calibration of a radar sensor of the vehicle safety system.

In an embodiment, the safety calibration device includes a target panel. The target panel has a surface which (operatively) faces the service area. The surface of the target panel bears an image providing a predetermined graphical feature, visible to a camera (or by a LIDAR sensor) of the vehicle. The graphical feature is configured to facilitate alignment or calibration of the camera (or LIDAR sensor) of the vehicle. In an embodiment, an operator selects a target panel bearing an image with a graphical feature determined as a function of the type of vehicle (make/model). In an embodiment, the surface of the target panel is reflective. In an embodiment, the surface of the target panel has high contrast.

In an embodiment, the target panel is configured to show an image used to calibrate infrared sensors (cameras) for night vision; in this case, the surface of the target panel has a contrast which is suitable for showing the image.

This disclosure also relates to a method. According to an aspect of this disclosure, the method is a method for aligning a headlight aiming device mounted on a headlight aiming device of a vehicle.

According to an aspect of this disclosure, the method is a method for aligning a vehicle calibration assistance structure relative to a vehicle.

The vehicle is positioned in a service area. The method is preferably used during a calibration or measurement procedure associated with the vehicle.

In an embodiment, the method comprises a step of providing support structure which supports a vehicle calibration assistance structure. In an embodiment, the headlight aiming device comprises a vehicle calibration assistance structure.

In an embodiment, the method comprises a step of providing a positioning device.

In an embodiment, the method comprises a step of viewing graphical features of the vehicle through an optical device. The optical device is included in the positioning device. In an embodiment, the positioning device is spaced from the support structure.

In an embodiment, the method comprises a step of providing a positioning target element which includes a surface that bears a predetermined graphical feature. The positioning target element is supported by (in an embodiment, connected to) the support structure.

In an embodiment, the method comprises a step of viewing the positioning target element with a matching camera included in the positioning device.

In an embodiment, the method comprises a step of processing data from the optical device and from the matching camera, using a processing system to determine measurements associated with the vehicle. In an embodiment, the measurements include at least one spatial correlation between the vehicle calibration assistance structure (or the headlight aiming device) and the vehicle.

In an embodiment, during the measurement or calibration procedure, the optical device is oriented in a lateral direction to view graphical features of the vehicle and the matching camera is oriented in a backward direction towards the support structure, to view the positioning target element. That way, the positioning device captures data representing the position of the vehicle and of the positioning target element (hence their positions relative to each other).

In an embodiment, the step of viewing includes viewing a portion of a vehicle through a first and a second camera of the optical device, connected in a stereo configuration. In an embodiment, the step of processing includes deriving a 3D representation of the vehicle portion viewed by the first and the second camera.

In an embodiment, the method comprises a step of adjusting a position of the vehicle calibration assistance structure (or of the headlight aiming device) relative to the vehicle. The step of adjusting includes projecting a laser ray on the vehicle positioned in the service area through an optical projection system included in the vehicle calibration assistance structure. The step of adjusting comprises horizontal movements of the support structure and/or vertical translations of the vehicle calibration assistance structure (or of the headlight aiming device) along the support structure.

In an embodiment, a camera is provided which is configured to see both the headlight and the position where the laser ray strikes the vehicle in order to correctly position the optical projection system relative to the vehicle. This camera and the vehicle must be on horizontal surfaces. Levels (both mechanical and electronic) and/or 3-axis accelerometers (for example, MEMS) are used to check the position of the camera.

In an embodiment, the movements necessary for adjusting the relative position are performed in automated manner.

In an embodiment, the step of adjusting comprises translating the calibration assistance structure in a horizontal direction (for example, by moving the base unit on its wheels) and/or in a vertical direction (for example, by moving the carriage along the support structure).

In an embodiment, method comprises a step of calibrating or aligning a component of the vehicle safety system using a safety calibration device (included in the vehicle calibration assistance structure). The component of the vehicle safety system may be any ADAS component (for example, a camera, a laser sensor, a radar sensor).

In an embodiment, the step of calibrating or aligning a component of the safety system is alternative to the step of aligning the headlights. In respective embodiments, the step of calibrating or aligning a component of the safety system follows or precedes the step of aligning the headlights. What is described (in connection with both the system and the method) with reference to the front of the vehicle also applies, with the necessary changes made, to the back and sides of the vehicle. In effect, the system can be configured to calibrate one or more of the following components: headlights, rear lights, front cameras, rear cameras, side cameras, front radar sensors, rear radar sensors, side radar sensors.

BRIEF DESCRIPTION OF THE DRAWINGS

These and other features are more apparent from the following description of a preferred embodiment, illustrated by way of non-limiting example in the accompanying drawings, in which:

FIGS. 2, 3, 4, 5, 6 illustrate a vehicle calibration assistance structure, with a support structure, a base unit and a positioning target element, of the headlight aiming device of FIG. 1 in respective embodiments;

DESCRIPTION OF THE PREFERRED EMBODIMENTS

Figure 1:
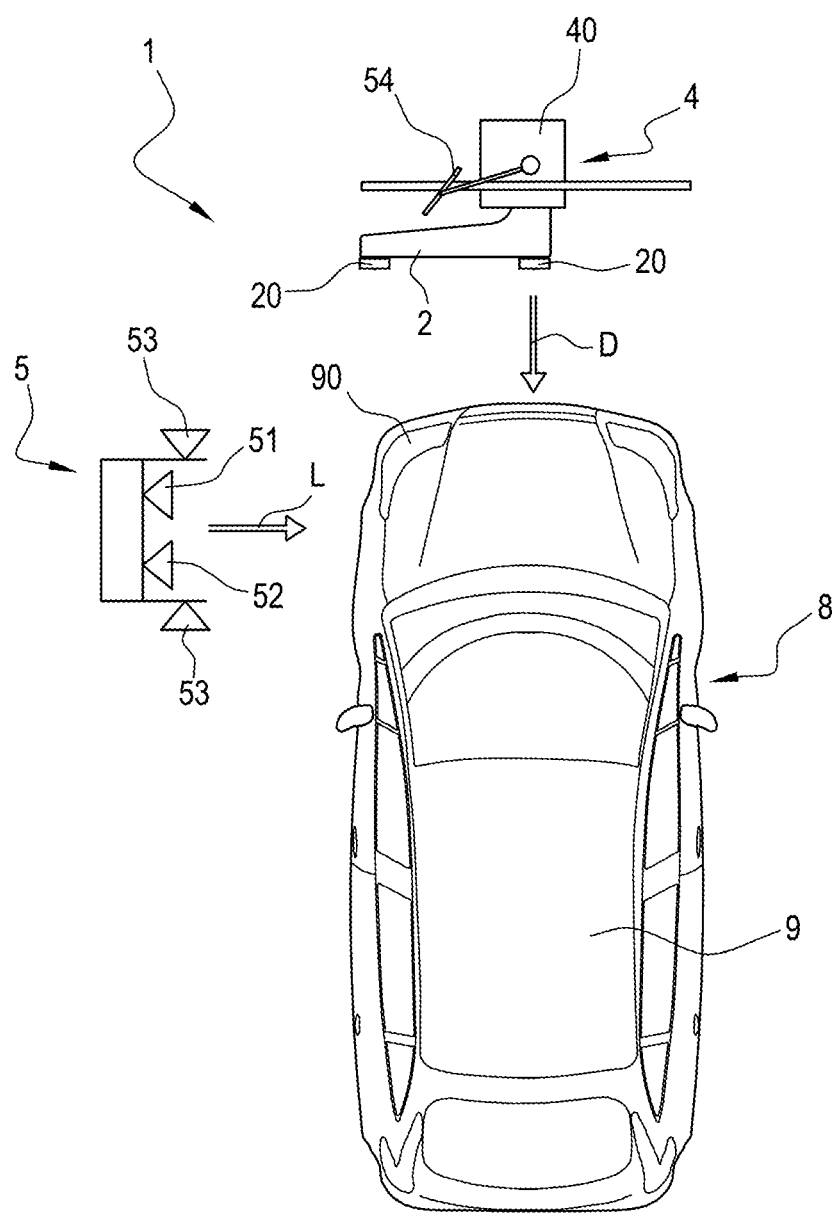
FIG. 1 illustrates a headlight aiming device according to this disclosure.
Figure 5:
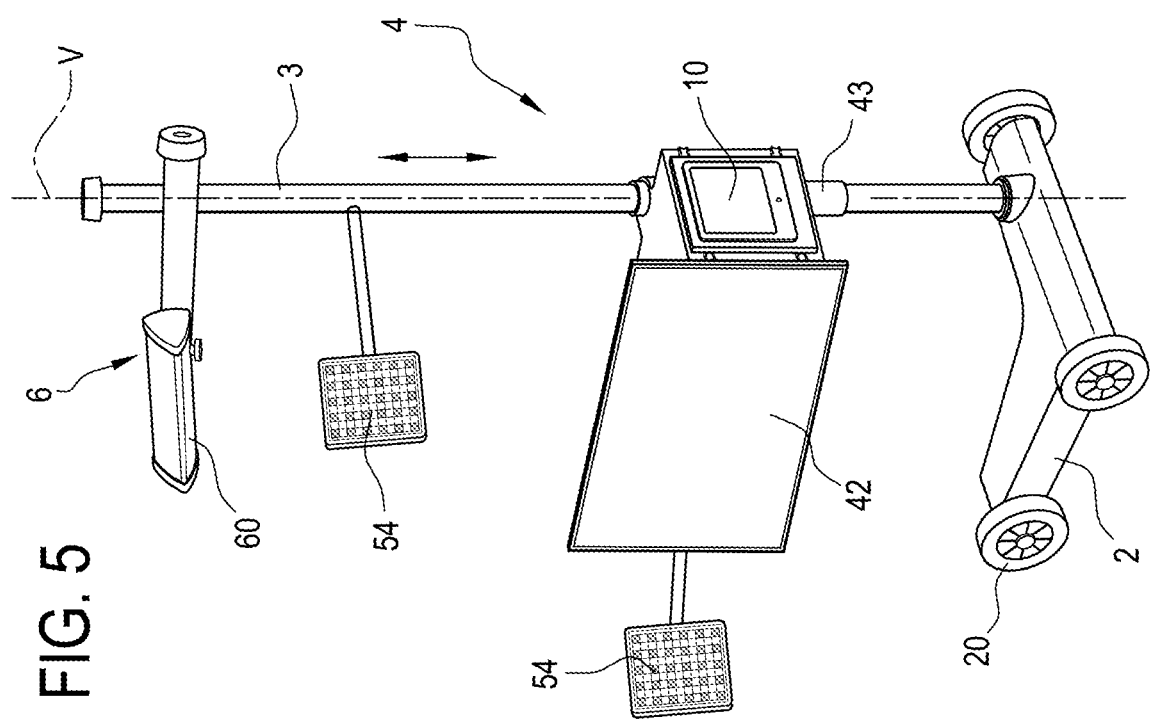
Figure 4:
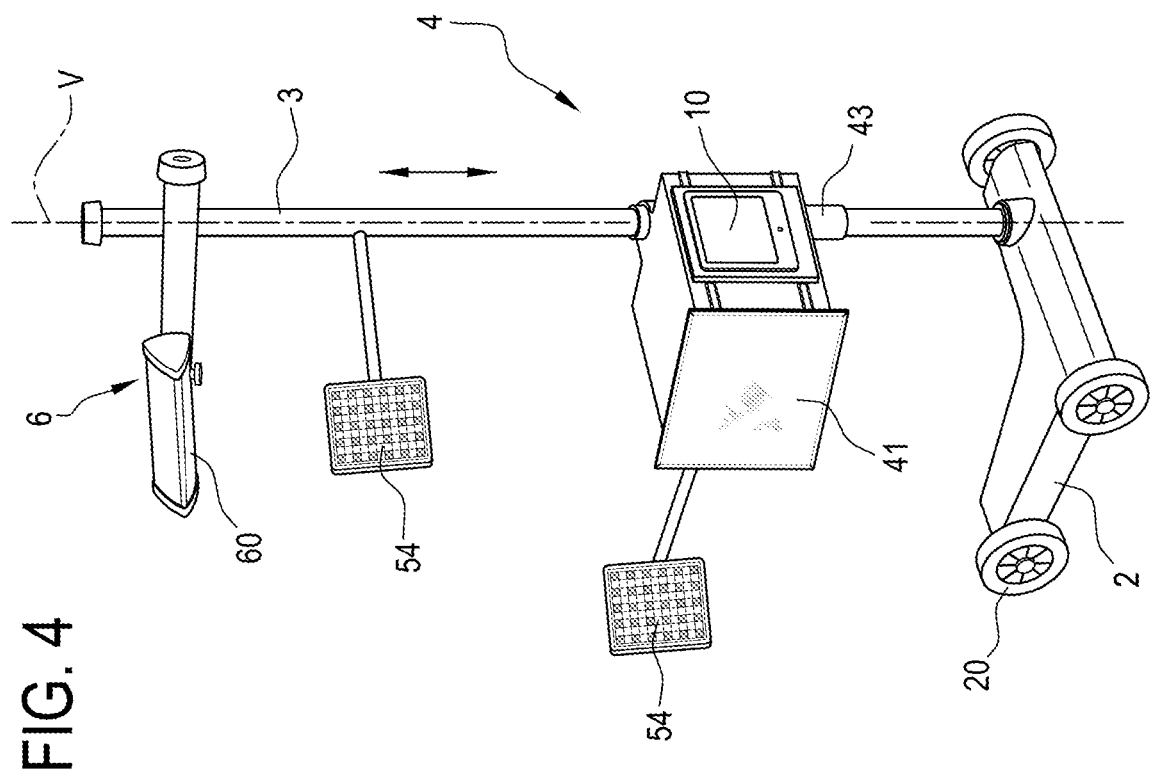
Figure 6:
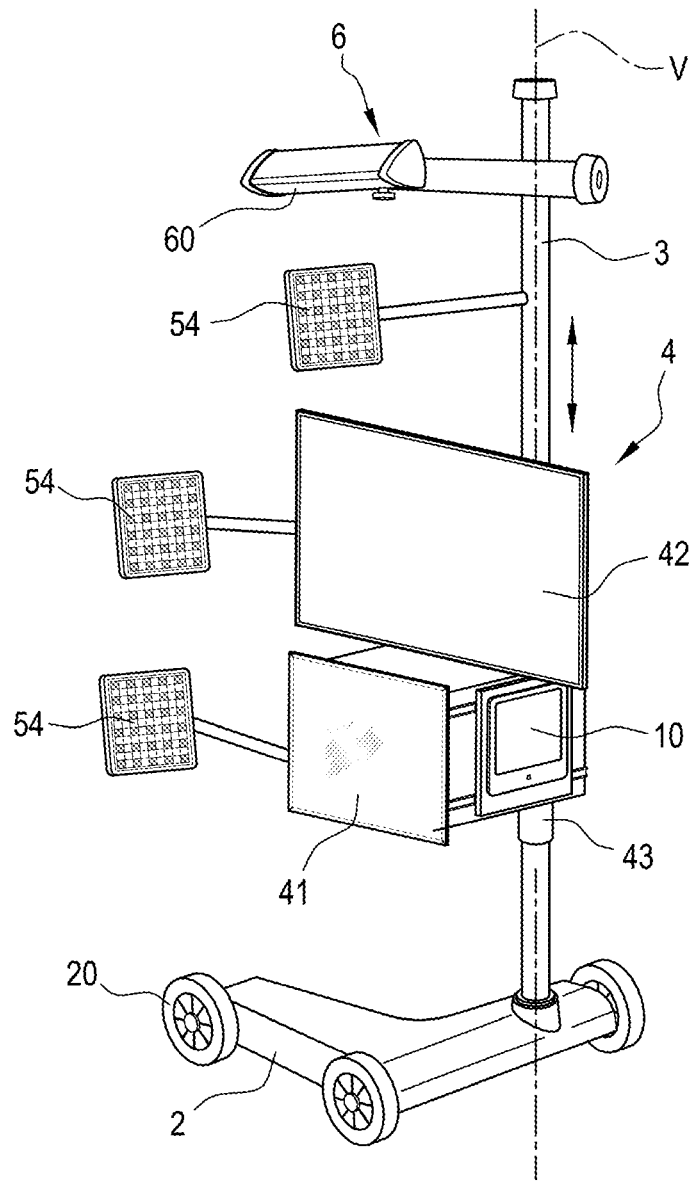
Figure 7:
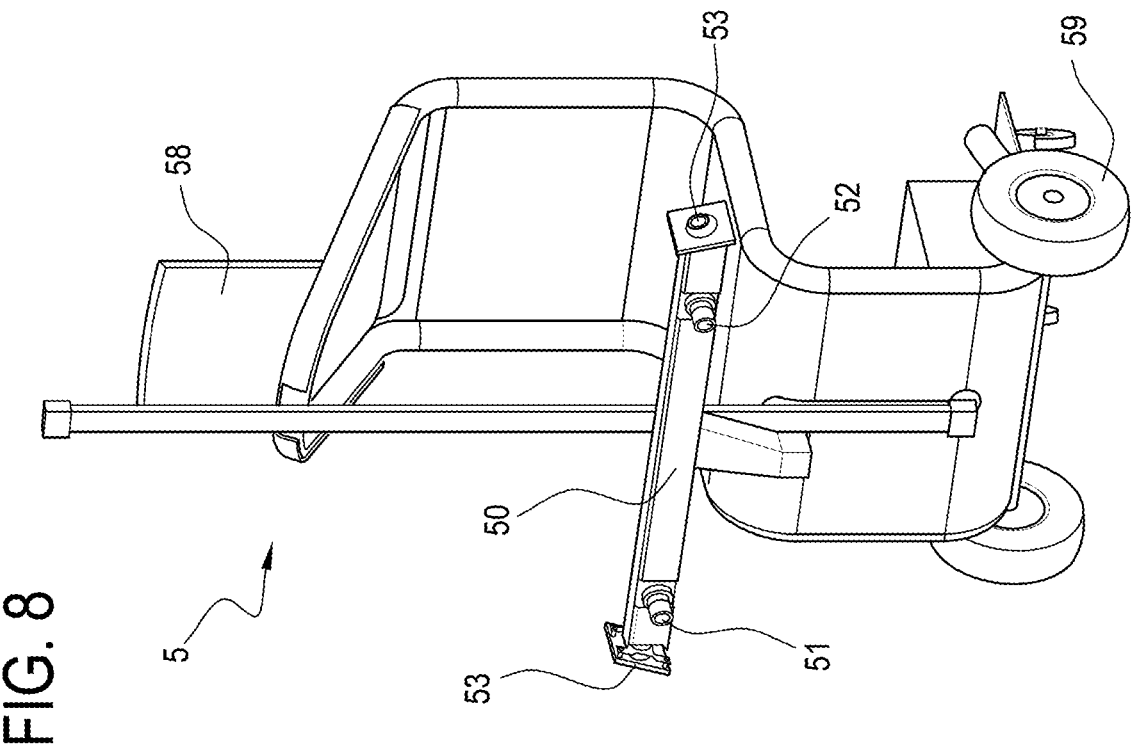
FIGS. 7 and 8 illustrate a positioning device of the headlight aiming device of FIG. 1.
Figure 8:
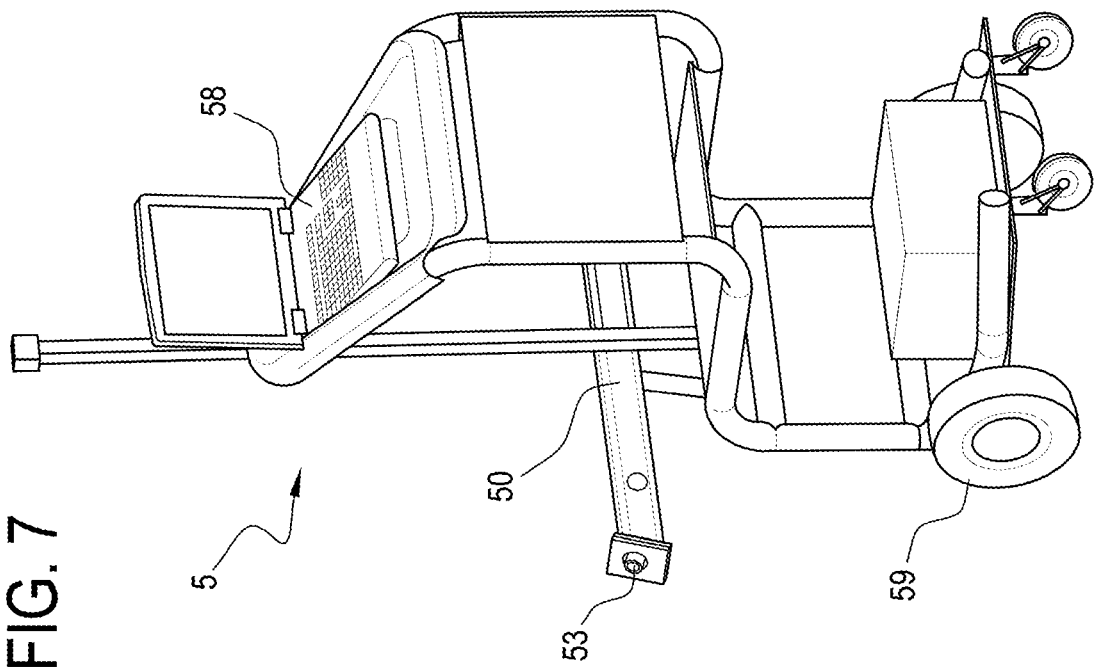

With reference to this disclosure, the numeral 1 denotes a headlight measurement system instrumentation structure (or headlight aiming device) for a vehicle 9.

The headlight aiming device 1 comprises a base unit 2. The base unit 2 comprises a plurality of wheels 20. The wheels 20 are configured to allow the base unit 2 to move on a supporting surface.

The system 1 comprises a support structure 3. The support structure 3 is connected to the base unit 2.

The system 1 comprises a vehicle calibration assistance structure 4. The vehicle calibration assistance structure 4 is mounted on the support structure 3.

In an embodiment, the vehicle calibration assistance structure 4 includes a headlight aiming device 40. The headlight aiming device 40 includes an optic housing having one or more Fresnel lenses.

In an embodiment, the vehicle calibration assistance structure 4 is removably attached to the support structure 3. In an embodiment, the vehicle calibration assistance structure 4 is slidable along the support structure 3 in a vertical direction V (parallel to the weight force). In an embodiment, the vehicle calibration assistance structure 4 is pivotable or rotatable along a horizontal axis (perpendicular to the vertical direction V). In an embodiment, the vehicle calibration assistance structure 4 is slidable along the support structure 3 in the horizontal direction.

Thanks to the wheels 20 of the base unit 2, the support structure 3 (that is, the vehicle calibration assistance structure 4) can be moved manually to a predetermined distance from the vehicle 4. In effect, different vehicles 9 may require the support structure 3 (that is, the vehicle calibration assistance structure 4) to be located at different positions relative to the vehicle 9. In an embodiment, at least one wheel 20 comprises a locking device configured to prevent accidental movement of the support structure 3 during use.

In an embodiment, the vehicle calibration assistance structure 4 includes a headlight aiming device configured to facilitate alignment or calibration of a headlight 90 of the vehicle 9. During the procedure, the vehicle 9 is positioned in a service area 8 and the support structure 3 is placed in front of the service area 8.

In an embodiment, the vehicle calibration assistance structure 4 includes a positioning target element 54. The positioning target element 54 includes a surface provided with a predetermined graphical feature. The positioning target element 54 is supported by the support structure 3. In an embodiment, the positioning target element 54 is connected to the headlight aiming device 40.

The positioning target element is oriented in a forward D towards the service area 8.

In an embodiment, the vehicle calibration assistance structure 4 includes a plurality of positioning target elements 54. For example, one positioning target element 54 might be connected to the support structure 3 and another positioning target element 54 might be connected to the headlight aiming device 40. In an embodiment, the mutual position between the positioning target element 54 and the headlight aiming device 40 is known beforehand.

In an embodiment, the system 1 comprises a positioning device 5. The positioning device 5 includes a frame 50. In one embodiment, the positioning device 5 includes a plurality of wheels 59 allowing it to be moved on the supporting surface it rests on. In another embodiment, the positioning device 5 is movable on guides. In an embodiment, the positioning device 5 includes an operator interface 58 (connected to the processing system).

The positioning device 5 is spaced from the support structure 3. The positioning device 5 is movable independently of the support structure 3. The positioning device 5 includes an optical device, oriented in lateral direction L to see graphical features of the vehicle 9 (for example, to see a wheel or targets fixed to the vehicle 9). The optical device includes a first camera 51 and a second camera 52. Preferably, the first camera 51 and the second camera 52 are connected in a stereo configuration. The first camera 51 and the second camera 52 are connected to the frame 50.

The positioning device 5 includes a matching camera 53 oriented in a backward direction to see the positioning target element. The matching camera 53 is connected to the frame 50.

The headlight aiming device 1 includes a processing system. The processing system includes a processor.

The processor may be positioned on the support structure 3 or in proximity to the support structure 3 or on the positioning device 5.

The processing system includes an operator interface 10. The operator interface 10 includes an input device and an output device. The operator interface may be on the support structure 3 or in proximity to the support structure 3 or on the positioning device 5.

The first camera, 51, the second camera 52 and the matching camera 53 are operatively connected to the processing system. The processing system is configured with logical components and software instructions to receive image data from the first camera 51, from the second camera 52 and from the matching camera 53, to process the image data and to identify the relative spatial positions of the surfaces viewed, such as, for example, optical targets mounted on the wheels or on other surfaces of the vehicle 9 (viewed by the first camera 51 and by the second camera 52) and the surface of the positioning target element 54 (viewed by the matching camera 53) and to determine a spatial correlation between the vehicle 9 and the positioning target element 54 (hence the support structure 3 and/or the headlight aiming device 40).

In one embodiment, the positioning device 5 includes an operator interface connected to the processing system.

In other embodiments, the positioning device 5 may be structured differently; for example, it may comprise a pair of arms connected to a vertical post (in one embodiment, forming part of the same support structure 3), configured to position the first and second cameras at positions where they can view graphical features or targets associated with the vehicle 9.

In an embodiment, the vehicle calibration assistance structure 4 includes a carriage 43. The carriage 43 is movably connected to the support structure 3. The carriage 43 is slidable along the support structure 3 in the vertical direction V. The vehicle calibration assistance structure 4 is vertically movable along a portion of said support structure 3 by means of the carriage 43.

The headlight aiming device 40 is mounted on the carriage 43. In an embodiment, the headlight aiming device 40 is removably mounted on the carriage 43. In an embodiment, the positioning target element 54 (or a target of the plurality of positioning target elements 54) is connected to the carriage 43. In an embodiment, the mutual position between the positioning target element 54 and the headlight aiming device 40 is known beforehand.

In an embodiment, the operator interface 10 is positioned on the carriage 43.

Precise positioning of the support structure 3 and/or of the carriage 43 to place the headlight aiming device 40 at the correct position for the headlight test procedure can be performed by an operator, under the guidance of the processing system (from the output device of the processing system) in response to the image data captured by the first camera 51, the second camera 52 and the matching camera 53. Guidance can be provided in a wide variety of ways, such as with numbers (for example, 2 cm to the right), symbols (for example, an arrow) or with sound (for example, by emitting a sound when the correct position is reached). Guidance may be static, if the relative position is not updated until the support structure 3 and the positioning device 5 are stopped, or dynamic, if the first camera 51, the second camera 52 and the matching camera 53 continue to capture images and to send image data to the processing system while the operator moves the support structure 3 and/or the positioning device 5, thus updating the position in real time.

In an embodiment, the headlight aiming device includes an optic housing containing one or more Fresnel lenses. The optic housing may be removably connected to the carriage 43.

In an embodiment, the vehicle calibration assistance structure 4 includes an optical projection system 6. The optical projection system 6 is connected to (supported by) the support structure 3. The optical projection system 6 includes a laser emitter 60. The laser emitter 60 is configured to project a ray onto a surface in proximity to the headlight aiming device 1 (for example, onto the vehicle 9). In an embodiment, the optical projection system 6 is disposed higher up than the supporting surface relative to the vehicle calibration assistance structure 4.

In an embodiment, the vehicle calibration assistance structure, which is mounted on the support structure, includes a safety calibration device, configured to facilitate alignment or calibration of a component of the safety system of the vehicle. The safety calibration device may be connected to the carriage 43 removably (in place of the headlight aiming device 40).

In an embodiment, the safety calibration device is (removably) fastened to the support structure 3. In an embodiment, the safety calibration device is slidable along the support structure 3 in the vertical direction V.

In an embodiment, the system includes a headlight aiming device 40 connected to the carriage 43 and at least one safety calibration device connected to the support structure 3; in this case, there may be a first positioning target element 54 connected to the carriage 43 (or to the headlight aiming device 40), a second positioning target element 54 connected to the safety calibration device and (in one embodiment) a third positioning target element 54 connected to the support structure 3.

In an embodiment, the safety calibration device includes a reflector 41 configured to reflect electromagnetic waves, configured to facilitate alignment or calibration of a radar sensor of the vehicle's safety system.

In an embodiment, the reflector 41 is mounted (removably or displaceably) on the support structure 3 in addition to the carriage 43 which the headlight aiming device is (removably or displaceably) connected to. In an embodiment, the reflector 41 is (removably) connected to the carriage 43 in place of the headlight aiming device 40.

In an embodiment, the safety calibration device includes a target panel 42 having a surface which faces the vehicle service area 8 and which bears an image providing a predetermined graphical feature to facilitate alignment or calibration of a camera or a LIDAR sensor of the vehicle 9.

In an embodiment, the target panel 42 is mounted (removably or displaceably) on the support structure 3 in addition to the carriage 43 which the headlight aiming device is (removably or displaceably) connected to. In an embodiment, the target panel 42 is (removably) connected to the carriage 43 in place of the headlight aiming device 40.

In an embodiment, the system 1 includes a reflector 41 which is (removably or displaceably) connected to the carriage 43 and a target panel 42 which is (removably or displaceably) connected to the support structure 3.

This disclosure also relates to a method for aligning a headlight aiming device 40 mounted on a headlight aiming device 1 for a vehicle 9 positioned in a service area 8, during a measurement or calibration procedure associated with the vehicle 9.

In an embodiment, the method comprises a step of providing support structure 3 which supports a vehicle calibration assistance structure 4. The vehicle calibration assistance structure 4 includes the headlight aiming device 40.

In an embodiment, the step of providing includes adjusting the headlight aiming device 40 in height by moving a carriage 43, which the headlight aiming device 40 is connected to, along a vertical direction V.

In an embodiment, the method comprises a step of viewing graphical features of the vehicle 9 through an optical device (comprising a first camera 51 and a second camera 52). The optical device is included in a positioning device 5 which is spaced from the support structure 3.

In an embodiment, the step of viewing includes viewing a portion of a vehicle 9 through a first camera 51 and a second camera 52 of the optical device 5, connected in a stereo configuration.

In an embodiment, the method comprises a step of viewing, with a matching camera 53 included in the positioning device 5, a positioning target element 54, which has a surface provided with a predetermined graphical feature and which is supported by the support structure 3.

During the measurement or calibration procedure the optical device 5 is oriented in a lateral direction L to view graphical features of the vehicle 9 and the matching camera 53 is oriented in a backward direction towards the support structure 3, to view the positioning target element 54.

In an embodiment, the method comprises a step of processing data from the optical device and from the matching camera 53, in a processing system, in order to determine measurements including at least one spatial correlation between the vehicle calibration assistance structure 4 and the vehicle 9.

In an embodiment, the step of processing includes deriving a 3D representation of the portion of the vehicle 9 viewed by the first camera 51 and the second camera 52.

In an embodiment, the method comprises a step of providing a safety calibration device. In an embodiment, the method includes a step of a aligning or calibrating a component of a safety system of the vehicle 9, using the safety calibration device.

The invention claimed is:

1. A vehicle headlight measurement system instrumentation structure, comprising:
   a base unit;
   a support structure connected to the base unit;
   a vehicle calibration assistance structure, which is carried by the support structure and includes a headlight aiming device, configured to facilitate alignment or calibration of a headlight of the vehicle, the vehicle being positioned within a service area;
   a positioning target element, having a surface provided with a predetermined graphical feature, the positioning target element being supported by the support structure and oriented in a forward direction towards the service area;
   a positioning device, configured for aiding a relative positioning between the vehicle, positioned in the service area, and the vehicle calibration assistance structure;
   a processing system,
wherein the processing system is operatively coupled to the positioning device to receive data therefrom and includes a processor configured with instructions to evaluate data received from the positioning device to determine measurements including at least a spatial relationship between the vehicle calibration assistance structure and the vehicle, wherein the positioning device is spaced from the support structure, is operatively located at a distance from the support structure and includes an optical device, oriented in a lateral direction substantially transversal to the forward direction, to view graphical features of the vehicle, and a matching camera, oriented in a backward direction opposite to the forward direction to view the positioning target element.

2. The vehicle headlight measurement system instrumentation structure of claim 1, wherein the optical device includes a first camera and a second camera, arranged in stereo configuration, the processing system being configured to derive a 3D representation of a vehicle portion viewed by the first and the second camera.

3. The vehicle headlight measurement system instrumentation structure of claim 2, wherein the positioning device includes a frame, wherein the optical device and the matching camera are attached to the frame, and an electronic board, attached to the frame and configured to communicate data to the processing system.

4. The vehicle headlight measurement system instrumentation structure of claim 1, wherein the vehicle calibration assistance structure includes a carriage which is movably connected to the support structure, wherein the headlight aiming device is mounted on the carriage, and wherein the positioning target element is attached to the carriage.

5. The vehicle headlight measurement system instrumentation structure of claim 1, wherein the vehicle calibration assistance structure includes an optical projection system, including at least a laser emitter, and wherein the processing system is operatively coupled to said optical projection system to activate said laser emitter to project a ray onto a surface in proximity to said vehicle headlight measurement system instrumentation structure.

6. The vehicle headlight measurement system instrumentation structure of claim 1, wherein said vehicle calibration assistance structure is vertically movable along a portion of said support structure.

7. The vehicle headlight measurement system instrumentation structure of claim 1, wherein said headlight aiming device includes an optic housing having one or more Fresnel lenses.

8. The vehicle headlight measurement system instrumentation structure of claim 1, wherein the processing system includes an operator interface including an input device and/or an output device, wherein the processor is configured with instructions to communicate with the operator interface.

9. The vehicle headlight measurement system instrumentation structure of claim 1, wherein the vehicle calibration assistance structure, which is mounted on the support structure, includes a safety calibration device, configured to facilitate alignment or calibration of a vehicle safety system component.

10. The vehicle headlight measurement system instrumentation structure of claim 9, wherein the safety calibration device includes a reflector designed for reflecting electromagnetic waves, configured to facilitate alignment or calibration of a radar-based safety system sensor of the vehicle.

11. The vehicle headlight measurement system instrumentation structure of claim 9, wherein the safety calibration device includes a target panel having a surface faced to the vehicle service area, on which an image providing a predetermined graphical feature, viewable by a camera of the vehicle is represented, to facilitate alignment or calibration of an optical safety system sensor of the vehicle.

12. A method for aligning a headlight aiming device, mounted on a vehicle headlight measurement system instrumentation structure, relative to a vehicle positioned in a service area, during a measurement or calibration procedure associated with the vehicle, the method comprising the following steps:
providing a support structure which supports a vehicle calibration assistance structure, the headlight aiming device being included in the vehicle calibration assistance structure;
observing graphical features of the vehicle, through an optical device, wherein the optical device is included in a positioning device which is spaced from the support structure and is located at a distance from the support structure;
viewing, via a matching camera included in the positioning device, a positioning target element, wherein the positioning target element has a surface provided with a predetermined graphical feature, is oriented in a forward direction toward the service area and is supported by the support structure, wherein the matching camera when viewing said positioning target element is oriented in a backward direction opposite to the forward direction, and the optical device when observing said features of the vehicle is oriented in a lateral direction substantially transversal to the forward direction;
processing, within a processing system, data from the optical device and from the matching camera, to determine measurements associated with the vehicle, the measurements including at least a spatial relationship between the vehicle calibration assistance structure and the vehicle.

13. The method of claim 12, wherein during the measurement or calibration procedure the optical device is oriented in a lateral direction to view graphical features of the vehicle and the matching camera is oriented in a backward direction towards the support structure, to view the positioning target element.

14. The method of claim 12, wherein the observing step includes viewing a vehicle portion through a first and a second camera of the optical device, arranged in stereo configuration, and the processing step includes deriving a 3D representation of the vehicle portion viewed by the first and second camera.

15. The method of claim 12, comprising a step of adjusting a position of the vehicle calibration assistance structure relative to the vehicle, wherein said adjusting step includes projecting a laser ray on the vehicle positioned in the vehicle service area through an optical projection system included in the vehicle calibration assistance structure.

* * * * *